United States Patent
Liu (10) Patent No.: US 11,742,769 B2
(45) Date of Patent: Aug. 29, 2023

(54) POWER CONVERSION APPARATUS AND SYNCHRONOUS RECTIFICATION CONTROLLER THEREOF

(71) Applicant: Power Forest Technology Corporation, Hsinchu County (TW)

(72) Inventor: Chia-Hsien Liu, Chiayi County (TW)

(73) Assignee: Power Forest Technology Corporation, Hsinchu County (TW)

( * ) Notice: Subject to any disclaimer, the term of this patent is extended or adjusted under 35 U.S.C. 154(b) by 119 days.

(21) Appl. No.: 17/488,335

(22) Filed: Sep. 29, 2021

(65) Prior Publication Data

US 2023/0058506 A1   Feb. 23, 2023

(30) Foreign Application Priority Data

Aug. 19, 2021   (TW) ................. 110130730

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ...... H02M 3/33592; H02M 1/08; H02M 1/32; H02M 3/33523
See application file for complete search history.

(56) References Cited

U.S. PATENT DOCUMENTS

| | | | |
|---|---|---|---|
| 10,056,845 B1 * | 8/2018 | Chu ................. | H02M 3/33592 |
| 10,079,549 B1 * | 9/2018 | Chu ................. | H02M 3/33592 |
| 11,489,451 B1 * | 11/2022 | Liu .................. | H02M 3/33592 |
| 2014/0192575 A1 * | 7/2014 | Olivik .............. | H02M 3/33592 363/89 |
| 2019/0222134 A1 * | 7/2019 | Kikuchi ........... | H02M 3/33592 |
| 2020/0343810 A1 | 10/2020 | Xu et al. | |

FOREIGN PATENT DOCUMENTS

| | | |
|---|---|---|
| CN | 112271927 | 1/2021 |
| TW | 200717978 | 5/2007 |
| TW | 201301729 | 1/2013 |
| TW | 202038539 | 10/2020 |

OTHER PUBLICATIONS

"Office Action of Taiwan Counterpart Application", dated Sep. 26, 2022, p. 1-p. 5.

* cited by examiner

*Primary Examiner* — Kyle J Moody
(74) *Attorney, Agent, or Firm* — JCIPRNET (57) ABSTRACT

A power conversion apparatus and a synchronous rectification controller thereof are provided. At least one of a differentiation operation and an integration operation is performed on a drain voltage signal of a synchronous rectification transistor. According to at least one of a differential signal obtained by performing the differential operation and an integral signal obtained by performing the integral operation, it is determined whether to turn on the synchronous rectification transistor at the next time when the drain voltage signal is less than or equal to a turn-on threshold voltage.

10 Claims, 5 Drawing Sheets

POWER CONVERSION APPARATUS AND SYNCHRONOUS RECTIFICATION CONTROLLER THEREOF

CROSS-REFERENCE TO RELATED APPLICATION

This application claims the priority benefit of Taiwanese application no. 110130730, filed on Aug. 19, 2021. The entirety of the above-mentioned patent application is hereby incorporated by reference herein and made a part of this specification.

BACKGROUND

Technical Field

The disclosure relates to a power apparatus. In particular, the disclosure relates to a power conversion apparatus and a synchronous rectification controller thereof.

Description of Related Art

A power conversion apparatus is an indispensable component in modern electronic apparatuses. In a power conversion apparatus based on pulse width modulation (PWM) control, the power conversion apparatus typically has a rectifier diode at a secondary side. Since power consumption of the rectifier diode is relatively large in a turn-on state, a synchronous rectification transistor with a lower on-resistance may be employed in place of the rectifier diode. Under such an architecture, a synchronous rectification controller is also needed to control the synchronous rectification transistor at the secondary side to be turned on or turned off.

When inductor-current is discharged to 0 at the secondary side of the power conversion apparatus, oscillation may accordingly occurs in a drain voltage of the synchronous rectification transistor. In the conventional art, it may be determined whether to turn on the synchronous rectification transistor by detecting a grade of a slope of the dropping drain voltage, to avoid turning on the synchronous rectification transistor during the inductor-capacitor oscillation period, which causes current reflux at an output terminal of the power conversion apparatus, thus causing damage to the power conversion apparatus and reducing the safety of use of the power conversion apparatus. However, as an operating frequency of current power supply systems increases, the falling slope of the drain voltage of the synchronous rectification transistor during the inductor-current discharge period becomes closer to the slope during the inductor-capacitor oscillation period gradually. As such, the turn-on timing of the synchronous rectification transistor may no longer be accurately determined by the above manner of determination.

SUMMARY

The disclosure provides a power conversion apparatus and a synchronous rectification controller thereof, which effectively increases accuracy in controlling switching of a synchronous rectification transistor to a turn-on state.

The synchronous rectification controller of the disclosure is configured to control a turn-on state of a synchronous rectification transistor. The synchronous rectification controller includes a turn-on control circuit and a turn-off control circuit. The turn-on control circuit is coupled to a drain terminal of the synchronous rectification transistor, performs at least one of a differentiation operation and an integration operation on a drain voltage signal of the synchronous rectification transistor, and determines whether to turn on the synchronous rectification transistor at a next time when the drain voltage signal is less than or equal to a turn-on threshold voltage according to at least one of a differential signal obtained by performing the differentiation operation and an integral signal obtained by performing the integration operation. The turn-off control circuit is coupled to the drain terminal of the synchronous rectification transistor, compares the drain voltage signal with a turn-off threshold voltage, and turns off the synchronous rectification transistor when the drain voltage signal is greater than the turn-off threshold voltage.

In an embodiment of the disclosure, if the drain voltage signal is greater than or equal to a predetermined voltage, and a signal value of the differential signal is equal to 0 for a predetermined time during a period in which the drain voltage signal is greater than or equal to the predetermined voltage, the turn-on control circuit turns on the synchronous rectification transistor at the next time when the drain voltage signal is less than or equal to the turn-on threshold voltage; and if the drain voltage signal is not greater than or equal to the predetermined voltage, or the signal value of the differential signal is not equal to 0 for the predetermined time during the period in which the drain voltage signal is greater than or equal to the predetermined voltage, the turn-on control circuit does not turn on the synchronous rectification transistor at the next time when the drain voltage signal is less than or equal to the turn-on threshold voltage.

In an embodiment of the disclosure, if a signal value of the differential signal is greater than or equal to a predetermined derivative, and the signal value of the differential signal is maintained at 0 for a predetermined time after being reduced from greater than or equal to the predetermined derivative to 0, the turn-on control circuit turns on the synchronous rectification transistor at the next time when the drain voltage signal is less than or equal to the turn-on threshold voltage; and if the signal value of the differential signal is not greater than or equal to the predetermined derivative, or the signal value of the differential signal is not maintained at 0 for the predetermined time after being reduced from greater than or equal to the predetermined derivative to 0, the turn-on control circuit does not turn on the synchronous rectification transistor at the next time when the drain voltage signal is less than or equal to the turn-on threshold voltage.

In an embodiment of the disclosure, if the drain voltage signal is greater than or equal to a predetermined voltage, and a signal value of the integral signal is greater than or equal to a predetermined integral during a period in which the drain voltage signal is greater than or equal to the predetermined voltage, the turn-on control circuit turns on the synchronous rectification transistor at the next time when the drain voltage signal is less than or equal to the turn-on threshold voltage; and if the drain voltage signal is not greater than or equal to the predetermined voltage, or the signal value of the integral signal is not greater than or equal to the predetermined integral during the period in which the drain voltage signal is greater than or equal to the predetermined voltage, the turn-on control circuit does not turn on the synchronous rectification transistor at the next time when the drain voltage signal is less than or equal to the turn-on threshold voltage.

In an embodiment of the disclosure, if a signal value of the differential signal is greater than or equal to a predetermined derivative and a signal value of the integral signal is greater than or equal to a predetermined integral during a period in which the drain voltage signal is greater than or equal to a predetermined voltage, the turn-on control circuit turns on the synchronous rectification transistor at the next time when the drain voltage signal is less than or equal to the turn-on threshold voltage; and if the signal value of the differential signal is not greater than or equal to the predetermined derivative or the signal value of the integral signal is not greater than or equal to the predetermined integral during the period in which the drain voltage signal is greater than or equal to the predetermined voltage, the turn-on control circuit does not turn on the synchronous rectification transistor at the next time when the drain voltage signal is less than or equal to the turn-on threshold voltage.

In an embodiment of the disclosure, the predetermined integral is equal to an integral value of the drain voltage signal in a predetermined time during the period in which the drain voltage signal is greater than or equal to the predetermined voltage.

In an embodiment of the disclosure, the synchronous rectification controller further includes a logic circuit. The logic circuit is coupled to the turn-on control circuit, the turn-off control circuit, and a gate terminal of the synchronous rectification transistor, and is controlled by the turn-on control circuit and the turn-off control circuit to generate a synchronous rectification control signal to the gate terminal of the synchronous rectification transistor.

In an embodiment of the disclosure, the logic circuit includes an SR flip-flop. A set terminal and a reset terminal of the SR flip-flop are respectively coupled to the turn-on control circuit and the turn-off control circuit, and an output terminal of the SR flip-flop is coupled to the gate of the synchronous rectification transistor terminal.

In an embodiment of the disclosure, the turn-off threshold voltage is greater than the turn-on threshold voltage.

The disclosure also provides a power conversion apparatus, including a transformer, a synchronous rectification transistor, and a synchronous rectification controller. The transformer has a primary side and a secondary side. A first terminal of the primary side is configured to receive an input voltage, and a first terminal of the secondary side is configured to provide an output voltage to a load. A drain terminal of the synchronous rectification transistor is coupled to a second terminal of the secondary side, and a source terminal of the synchronous rectification transistor is coupled to a ground terminal. The synchronous rectification controller is coupled between the drain terminal and a gate terminal of the synchronous rectification transistor, and is configured to control a turn-on state of the synchronous rectification transistor. The synchronous rectification controller includes a turn-on control circuit and a turn-off control circuit. The turn-on control circuit is coupled to the drain terminal of the synchronous rectification transistor, performs at least one of a differentiation operation and an integration operation on a drain voltage signal of the synchronous rectification transistor, and determines whether to turn on the synchronous rectification transistor at a next time when the drain voltage signal is less than or equal to a turn-on threshold voltage according to at least one of a differential signal obtained by performing the differentiation operation and an integral signal obtained by performing the integration operation. The turn-off control circuit is coupled to the drain terminal of the synchronous rectification transistor, compares the drain voltage signal with a turn-off threshold voltage, and turns off the synchronous rectification transistor when the drain voltage signal is greater than the turn-off threshold voltage.

Based on the foregoing, the turn-on control circuit in the embodiments of the disclosure may perform at least one of a differentiation operation and an integration operation on the drain voltage signal of the synchronous rectification transistor, and determine whether to turn on the synchronous rectification transistor at the next time when the drain voltage signal is less than or equal to the turn-on threshold voltage according to at least one of the differential signal obtained by performing the differentiation operation and the integral signal obtained by performing the integration operation. Accordingly, by determining the change of the drain voltage signal of the synchronous rectification transistor with the differential signal and the integral signal, the inductor-current discharge period and the inductor-capacitor oscillation period can be accurately distinguished, thus effectively increasing the accuracy in controlling the switching of the synchronous rectification transistor to the turn-on state.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to make the disclosure more comprehensible, embodiments are particularly provided below as examples according to which the disclosure can be reliably carried out. In addition, wherever possible, elements/members/steps labeled with the same reference numerals in the drawings and embodiments denote the same or similar parts.

Figure 1:
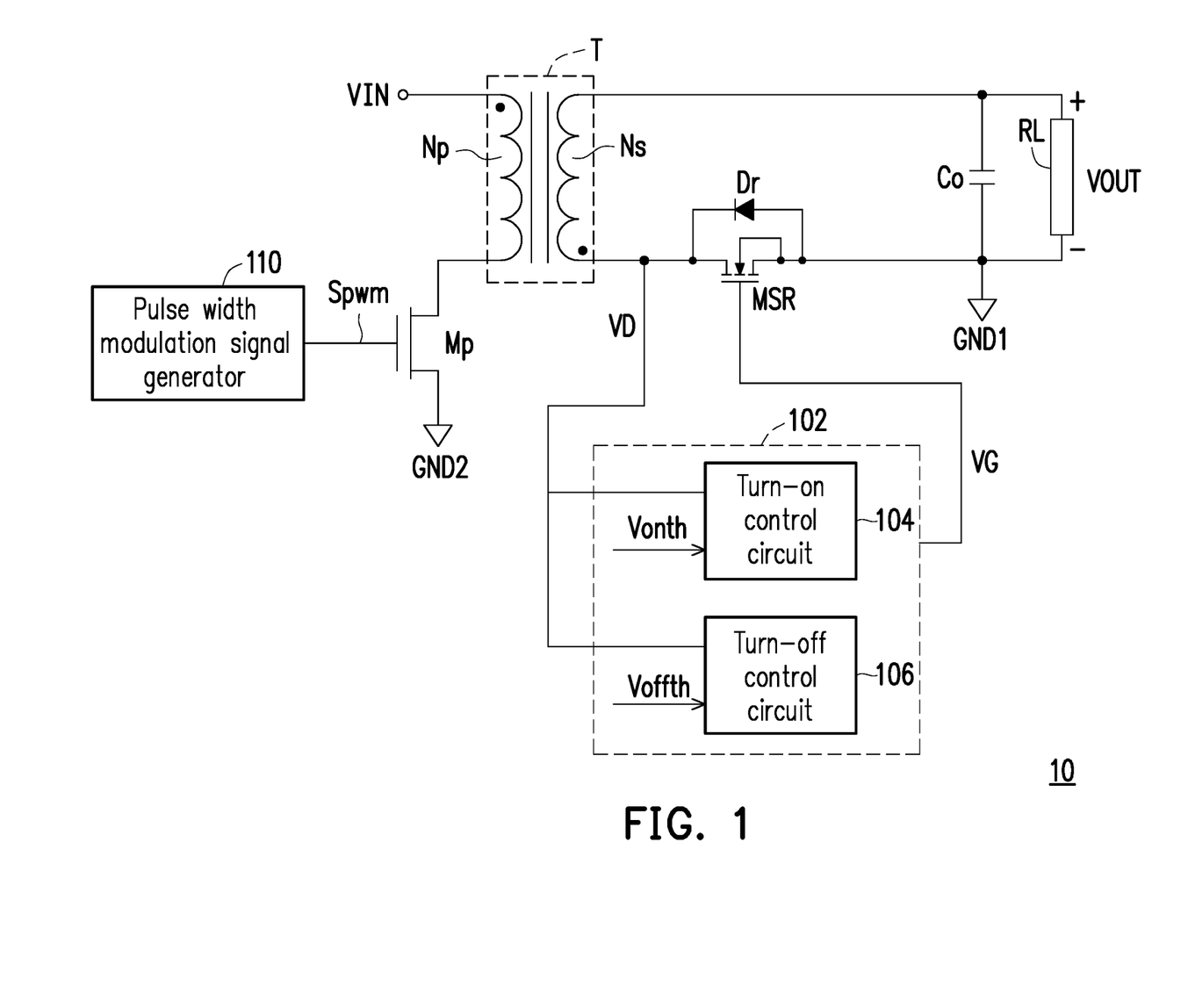
FIG. 1 is a schematic circuit block diagram illustrating a power conversion apparatus shown according to an embodiment of the disclosure.

FIG. 1 is a schematic circuit block diagram illustrating a power conversion apparatus shown according to an embodiment of the disclosure. In this embodiment, a power conversion apparatus 10 has a flyback architecture, but is not limited to this. In other embodiments, the power conversion apparatus may also have, for example, a push-pull, forward, half-bridge, or full-bridge architecture or other types of architecture. Operation of the power conversion apparatus of other architectures may be deduced from the operation of this embodiment.

The power conversion apparatus 10 includes a transformer T, a synchronous rectification transistor MSR, a synchronous rectification controller 102, a power switch Mp, and a pulse width modulation signal generator 110, but is not limited thereto. The transformer T includes a primary side Np and a secondary side Ns. A first terminal (e.g., a common-polarity terminal, i.e., a dotted terminal) of the primary side Np is configured to receive an input voltage VIN, and a first terminal (e.g., an opposite-polarity terminal, i.e., non-dotted terminal) of the secondary side Ns is configured to provide an output voltage VOUT to a load RL (e.g., an electronic device) and charge a capacitor Co. Nonetheless, the disclosure is not limited thereto.

A first terminal of the power switch Mp is coupled to a second terminal (e.g., an opposite-polarity terminal) of the primary side Np, a second terminal of the power switch Mp is coupled to a second ground terminal GND2, and a control terminal of the power switch Mp is coupled to the pulse width modulation signal generator 110 to receive a pulse width modulation signal Spwm. The pulse width modulation signal generator 110 may generate and adjust the pulse width modulation signal Spwm according to the state of the load RL (or the power supply requirement).

A drain terminal of the synchronous rectification transistor MSR is coupled to a second terminal (e.g., a common-polarity terminal) of the secondary side Ns, and a source terminal and a body terminal of the synchronous rectification transistor MSR are coupled to a first ground terminal GND1. A parasitic diode Dr is present between the drain terminal and the body terminal of the synchronous rectification transistor MSR. In an embodiment of the disclosure, the synchronous rectification transistor MSR may be an N-type metal-oxide-semiconductor field-effect transistor. Nonetheless, the disclosure is not limited thereto and may be determined depending on actual application or design requirements. The synchronous rectification controller 102 is coupled to the drain terminal of the synchronous rectification transistor MSR to receive a drain voltage signal VD. According to the voltage level of the drain voltage signal VD, the synchronous rectification controller 102 may correspondingly generate a synchronous rectification control signal VG to a gate terminal of the synchronous rectification transistor MSR to control a turn-on state of the synchronous rectification transistor MSR.

The synchronous rectification controller 102 includes a turn-on control circuit 104 and a turn-off control circuit 106. The turn-on control circuit 104 and the turn-off control circuit 106 are coupled to the drain terminal of the synchronous rectification transistor MSR.

The turn-on control circuit 104 may perform at least one of a differentiation operation and an integration operation on the drain voltage signal VD, and determine whether to turn on the synchronous rectification transistor MSR at the next time when the drain voltage signal VD is less than or equal to a turn-on threshold voltage Vonth according to at least one of a differential signal obtained by performing the differentiation operation and an integral signal obtained by performing the integration operation. In addition, the turn-off control circuit 106 may compare the drain voltage signal VD with a turn-off threshold voltage Voffth, and the turn-off control circuit 106 may turn off the synchronous rectification transistor MSR when the drain voltage signal VD is greater than the turn-off threshold voltage Voffth. The turn-off threshold voltage Voffth is greater than the turn-on threshold voltage Vonth.

Accordingly, by determining the change of the drain voltage signal VD of the synchronous rectification transistor MSR with at least one of the differential signal and the integral signal of the drain voltage signal VD, it can be accurately distinguished whether the secondary side of the power conversion apparatus 10 is in an inductor-current discharge period or an inductor-capacitor oscillation period, thus effectively increasing the accuracy in controlling the switching of the synchronous rectification transistor to the turn-on state.

Figure 2:
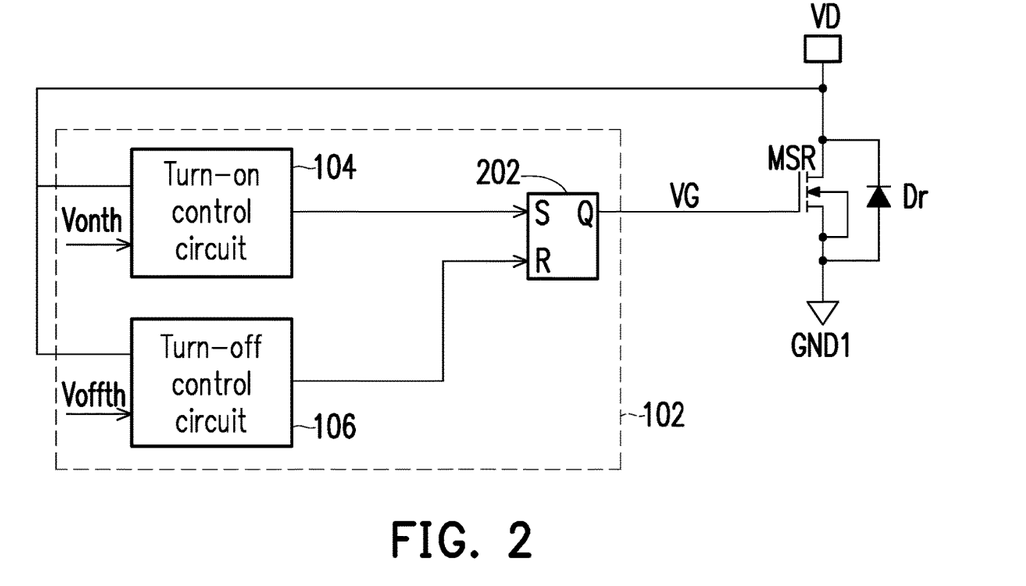
FIG. 2 is a schematic circuit diagram illustrating a synchronous rectification controller according to an embodiment of the disclosure.

In some embodiments, the synchronous rectification controller 102 may also include a logic circuit. The logic circuit is coupled to the turn-on control circuit 104, the turn-off control circuit 106, and the gate terminal of the synchronous rectification transistor MSR, and is controlled by the turn-on control circuit 104 and the turn-off control circuit 106 to generate the synchronous rectification control signal to the gate terminal of the synchronous rectification transistor. As shown in FIG. 2, in this embodiment, the logic circuit is implemented as, for example but not limited to, an SR flip-flop 202. A set terminal S and a reset terminal R of the SR flip-flop 202 are respectively coupled to the turn-on control circuit 104 and the turn-off control circuit 106, and an output terminal Q of the SR flip-flop 202 is coupled to the gate terminal of the synchronous rectification transistor MSR. According to a turn-on control signal output by the turn-on control circuit 104 and a turn-off control signal output by the turn-off control circuit 106, the SR flip-flop 202 may output the synchronous rectification control signal VG to control the turn-on state of the synchronous rectification transistor MSR.

Figure 3:
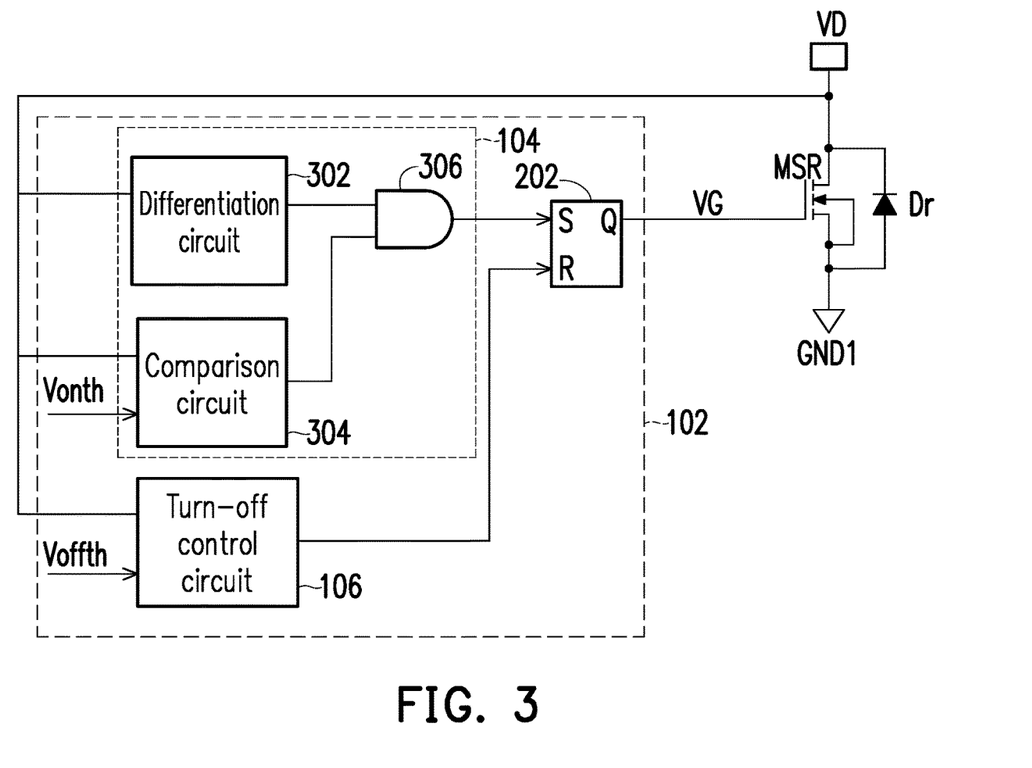
FIG. 3 is a schematic circuit diagram illustrating a synchronous rectification controller according to another embodiment of the disclosure.
Figure 4:
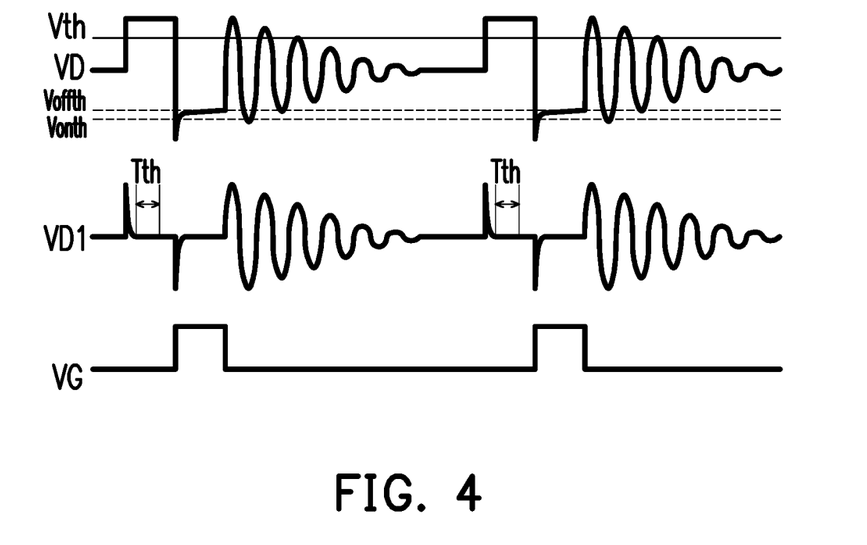
FIG. 4 is a schematic signal timing diagram of a synchronous rectification controller according to an embodiment of the disclosure.

For example, FIG. 3 is a schematic circuit diagram illustrating a synchronous rectification controller according to another embodiment of the disclosure, and FIG. 4 is a schematic signal timing diagram of the synchronous rectification controller. With reference to FIG. 3 and FIG. 4, the turn-on control circuit 104 may perform a differentiation operation on the drain voltage signal VD. Further, the turn-on control circuit 104 may include a differentiation circuit 302, a comparison circuit 304, and an AND gate 306. The differentiation circuit 302 is coupled between the drain terminal of the synchronous rectification transistor MSR and an input terminal of the AND gate 306. The comparison circuit 304 is coupled between the drain terminal of the synchronous rectification transistor MSR and another input terminal of the AND gate 306. An output terminal of the AND gate 306 is coupled to the set terminal S of the SR flip-flop 202.

The differentiation circuit 302 may perform a differentiation operation on the drain voltage signal VD to obtain a differential signal VD1. As shown in FIG. 4, when the power switch Mp is turned on, the input voltage VIN supplies power to the coil at the primary side Np of the transformer T for energy storage. At this time, since the drain voltage VD is rapidly pulled up to K×VIN, a positive surge occurs in the differential signal VD1, where K is the coil ratio between the secondary side Ns and the primary side Np of the transformer T. At this time, the parasitic diode Dr of the synchronous rectification transistor MSR is reversely biased and turned off. In addition, when the power switch Mp is cut off in response to the pulse width modulation signal Spwm generated by the pulse width modulation signal generator 110, based on Lenz's law, the energy stored at the primary side Np of the transformer T will be transferred to the secondary side Ns of the transformer T. At the same time, the parasitic diode Dr of the synchronous rectification transistor MSR is forward biased and turned on. Since the body terminal of the synchronous rectification transistor MSR is coupled to the first ground terminal GND1, the voltage level (i.e., the drain voltage VD) of the drain terminal of the synchronous rectification transistor MSR drops rapidly from K×VIN to a negative voltage value. Therefore, a negative surge occurs in the differential signal VD1.

The differentiation circuit 302 may determine whether the drain voltage signal VD is greater than or equal to a predetermined voltage Vth (i.e., whether the voltage of the positive surge is greater than or equal to the predetermined voltage Vth), and whether a signal value of the differential signal VD1 is equal to 0 for a predetermined time Tth during the period in which the drain voltage signal VD is greater than or equal to the predetermined voltage Vth (i.e., whether the voltage value of the positive surge is maintained at 0 for the predetermined time Tth after returning to 0 during the period from the occurrence of the positive surge to the occurrence of the negative surge). When the drain voltage signal VD is greater than or equal to the predetermined voltage Vth, and the signal value of the differential signal VD1 is equal to 0 for the predetermined time Tth during the period in which the drain voltage signal VD is greater than or equal to the predetermined voltage Vth, the differentiation circuit 302 outputs a first control signal with a high voltage level to the AND gate 306. In addition, if the drain voltage signal VD is not greater than or equal to the predetermined voltage Vth, or the signal value of the differential signal VD1 is not equal to 0 for the predetermined time Tth during the period in which the drain voltage signal VD is greater than or equal to the predetermined voltage Vth, the differentiation circuit 302 outputs a first control signal with a low voltage level to the AND gate 306.

Besides, the comparison circuit 304 may compare the drain voltage signal VD with the turn-on threshold voltage Vonth. When the drain voltage signal VD is less than or equal to the turn-on threshold voltage Vonth, the comparison circuit 304 outputs a second control signal with a high voltage level to the AND gate 306. On the other hand, if the drain voltage signal VD is not less than or equal to the turn-on threshold voltage Vonth, the comparison circuit 304 outputs a second control signal with a low voltage level to the AND gate 306. The AND gate 306 may generate a turn-on control signal to the set terminal S of the SR flip-flop 202 according to the first control signal and the second control signal.

In addition, the turn-off control circuit 106 may compare the drain voltage signal VD with the turn-off threshold voltage Voffth. When the drain voltage signal VD is greater than the turn-off threshold voltage Voffth, the turn-off control circuit 106 may output a turn-off control signal with a high voltage level to the reset terminal R of the SR flip-flop 202. On the other hand, if the drain voltage signal VD is not greater than the turn-off threshold voltage Voffth, the turn-off control circuit 106 outputs a turn-off control signal with a low voltage level to the reset terminal R of the SR flip-flop 202.

Accordingly, if the differentiation circuit 302 determines that the drain voltage signal VD is greater than or equal to the predetermined voltage Vth, and the signal value of the differential signal VD1 is equal to 0 for the predetermined time Tth during the period in which the drain voltage signal VD is greater than or equal to the predetermined voltage Vth, the turn-on control circuit 104 may turn on the synchronous rectification transistor MSR (transform the synchronous rectification control signal VG to a high voltage level) at the next time when the drain voltage signal VD is less than or equal to the turn-on threshold voltage Vonth. On the other hand, if the differentiation circuit 302 determines that the drain voltage signal VD is not greater than or equal to the predetermined voltage Vth, or the signal value of the differential signal VD1 is not equal to 0 for the predetermined time Tth during the period in which the drain voltage signal VD is greater than or equal to the predetermined voltage Vth, the turn-on control circuit 104 does not turn on the synchronous rectification transistor MSR at the next time when the drain voltage signal VD is less than or equal to the turn-on threshold voltage Vonth, to avoid turning on the synchronous rectification transistor MSR during the oscillation period of the drain voltage signal VD of the synchronous rectification transistor MSR, which causes current reflux at an output terminal of the power conversion apparatus 10, thus causing damage to the power conversion apparatus 10.

Figure 5:
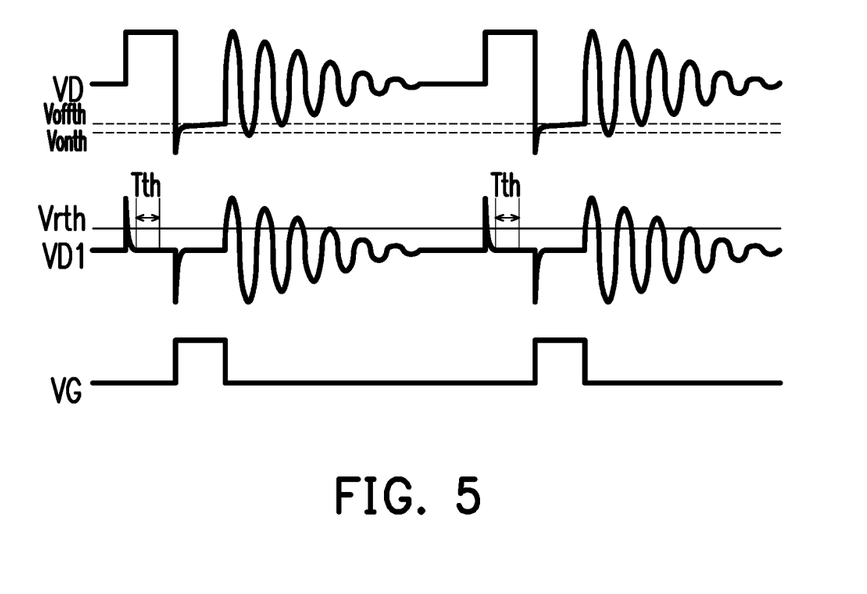
FIG. 5 is a schematic signal timing diagram of a synchronous rectification controller according to another embodiment of the disclosure.

It is worth noting that, in some embodiments, the differentiation circuit 302 may also determine whether to turn on the synchronous rectification transistor MSR according to whether the signal value of the differential signal VD1 is greater than or equal to a predetermined derivative. For example, in the embodiment as shown in FIG. 5, if the differentiation circuit 302 determines that the signal value of the differential signal VD1 is greater than or equal to a predetermined derivative Vrth, and the signal value of the differential signal VD1 is maintained at 0 for the predetermined time Tth after being reduced from greater than or equal to the predetermined derivative Vrth to 0, the turn-on control circuit 104 may turn on the synchronous rectification transistor MSR at the next time when the drain voltage signal VD is less than or equal to the turn-on threshold voltage Vonth. On the other hand, if the differentiation circuit 302 determines that the signal value of the differential signal VD1 is not greater than or equal to the predetermined derivative Vrth, or the signal value of the differential signal VD1 is not maintained at 0 for the predetermined time Tth after being reduced from greater than or equal to the predetermined derivative Vrth to 0, the turn-on control circuit 104 does not turn on the synchronous rectification transistor MSR at the next time when the drain voltage signal VD is less than or equal to the turn-on threshold voltage Vonth.

Figure 6:
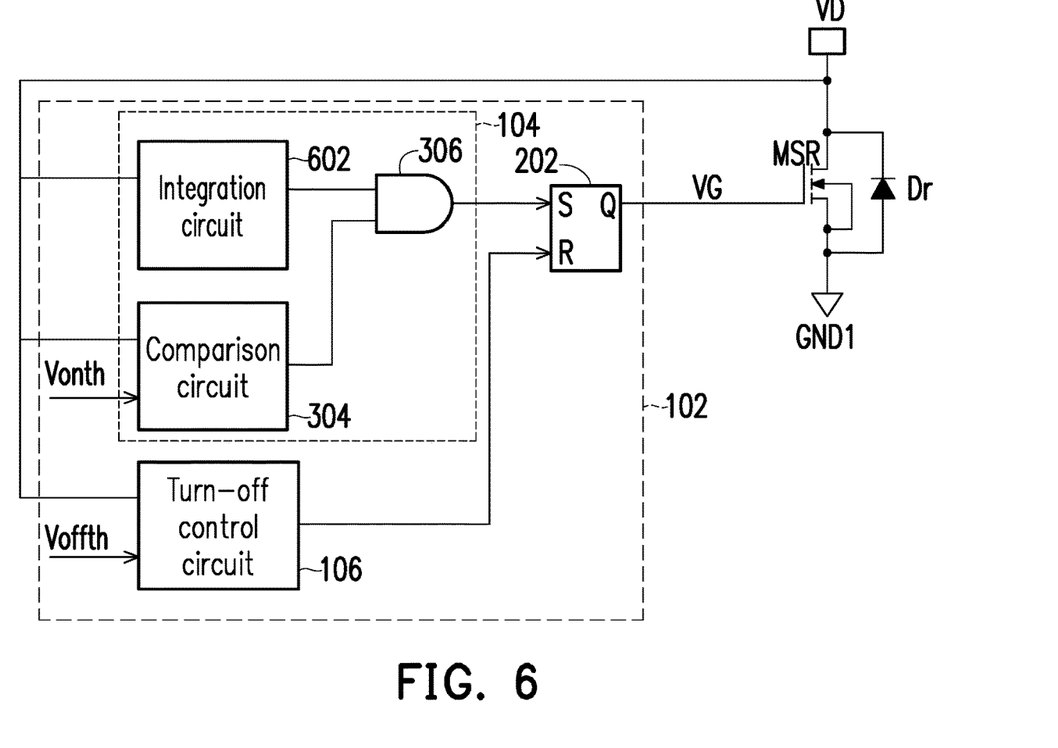
FIG. 6 is a schematic circuit diagram illustrating a synchronous rectification controller according to yet another embodiment of the disclosure.
Figure 7:
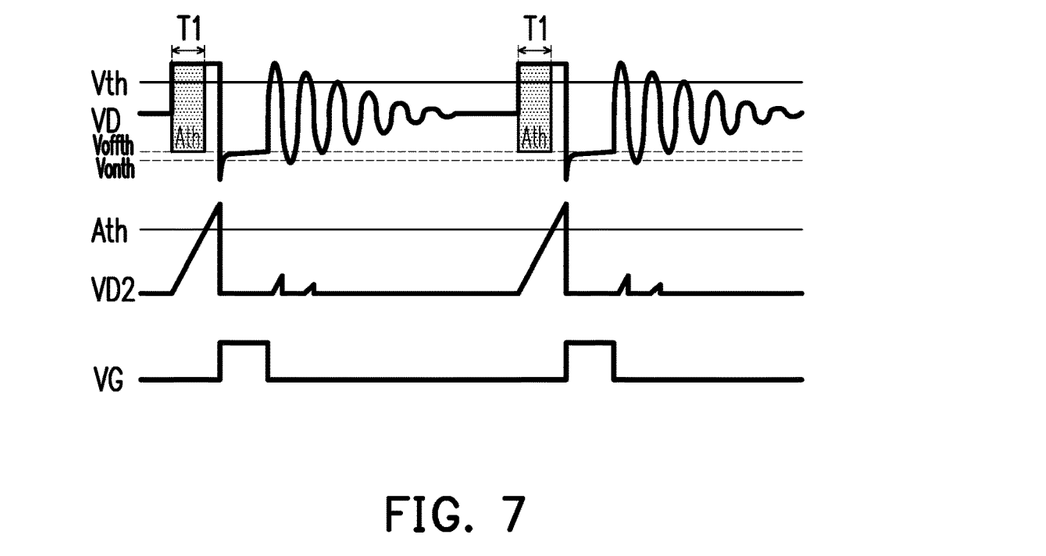
FIG. 7 is a schematic signal timing diagram of a synchronous rectification controller according to the yet another embodiment of the disclosure.

FIG. 6 is a schematic circuit diagram illustrating a synchronous rectification controller according to yet another embodiment of the disclosure, and FIG. 7 is a schematic signal timing diagram of the synchronous rectification controller of the embodiment of FIG. 6. With reference to FIG. 6 and FIG. 7, the difference between the embodiment of FIG. 6 and the embodiment of FIG. 3 lies in that the differentiation circuit of FIG. 3 is replaced by an integration circuit 602 in this embodiment. The integration circuit 602 may perform an integration operation on the drain voltage signal VD to obtain an integral signal VD2, and determine whether the drain voltage signal VD is greater than or equal to the predetermined voltage Vth, and whether a signal value of the integral signal VD2 is greater than or equal to a predetermined integral Ath during the period in which the drain voltage signal VD is greater than or equal to the predetermined voltage Vth. The predetermined integral Ath may be, for example, an integral value of the drain voltage signal in a predetermined time T1 during the period in which the drain voltage signal VD is greater than or equal to the predetermined voltage Vth.

When the drain voltage signal VD is greater than or equal to the predetermined voltage Vth, and the signal value of the integral signal VD2 is greater than or equal to the predetermined integral Ath during the period in which the drain voltage signal VD is greater than or equal to the predetermined voltage Vth, the integration circuit 602 outputs a first control signal with a high voltage level to the AND gate 306. On the other hand, if the drain voltage signal VD is not greater than or equal to the predetermined voltage Vth, or the signal value of the integral signal VD2 is not greater than or equal to the predetermined integral Ath during the period in which the drain voltage signal VD is greater than or equal to the predetermined voltage Vth, the integration circuit 602 outputs a first control signal with a low voltage level to the AND gate 306. The details of implementing the comparison circuit 304 and the turn-off control circuit 106 are the same as those in the embodiment of FIG. 3, so they will not be repeatedly described herein.

Accordingly, if the drain voltage signal VD is greater than or equal to the predetermined voltage Vth, and the signal value of the integral signal VD2 is greater than or equal to the predetermined integral Ath during the period in which the drain voltage signal VD is greater than or equal to the predetermined voltage Vth, the turn-on control circuit 104 may turn on the synchronous rectification transistor MSR at the next time when the drain voltage signal VD is less than or equal to the turn-on threshold voltage Vonth. On the other hand, if the drain voltage signal VD is not greater than or equal to the predetermined voltage Vth, or the signal value of the integral signal VD2 is not greater than or equal to the predetermined integral Ath during the period in which the drain voltage signal VD is greater than or equal to the predetermined voltage Vth, the turn-on control circuit 104 does not turn on the synchronous rectification transistor MSR at the next time when the drain voltage signal VD is less than or equal to the turn-on threshold voltage Vonth, to avoid turning on the synchronous rectification transistor MSR during the oscillation period of the drain voltage signal VD of the synchronous rectification transistor MSR.

Figure 8:
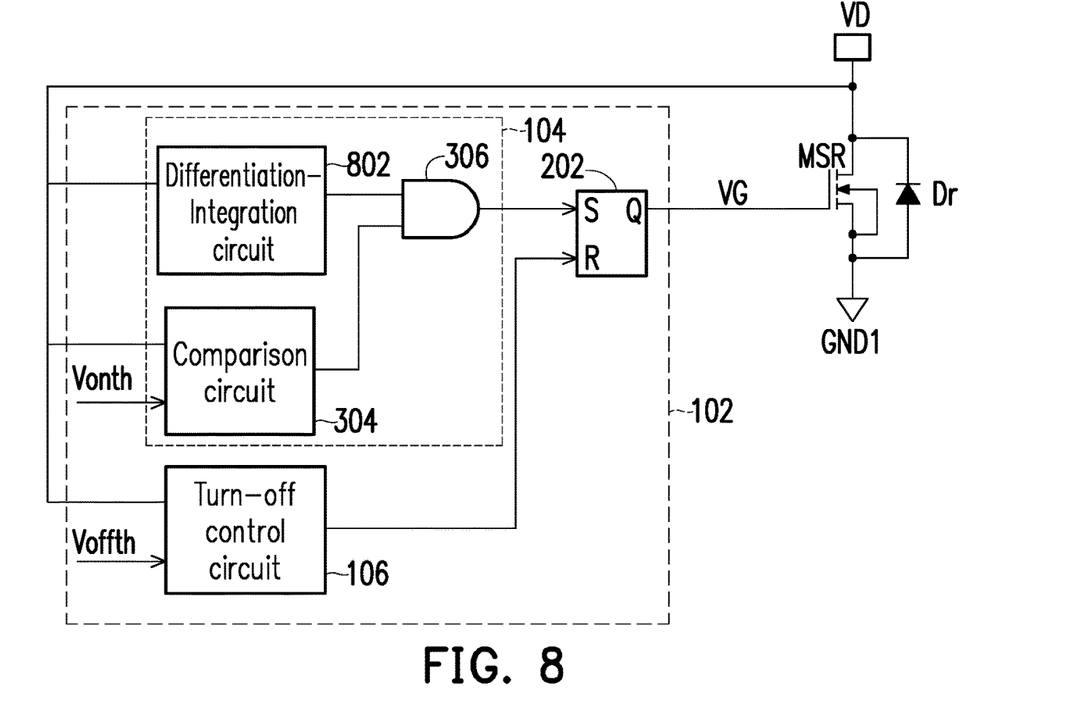
FIG. 8 is a schematic circuit diagram illustrating a synchronous rectification controller according to still another embodiment of the disclosure.
Figure 9:
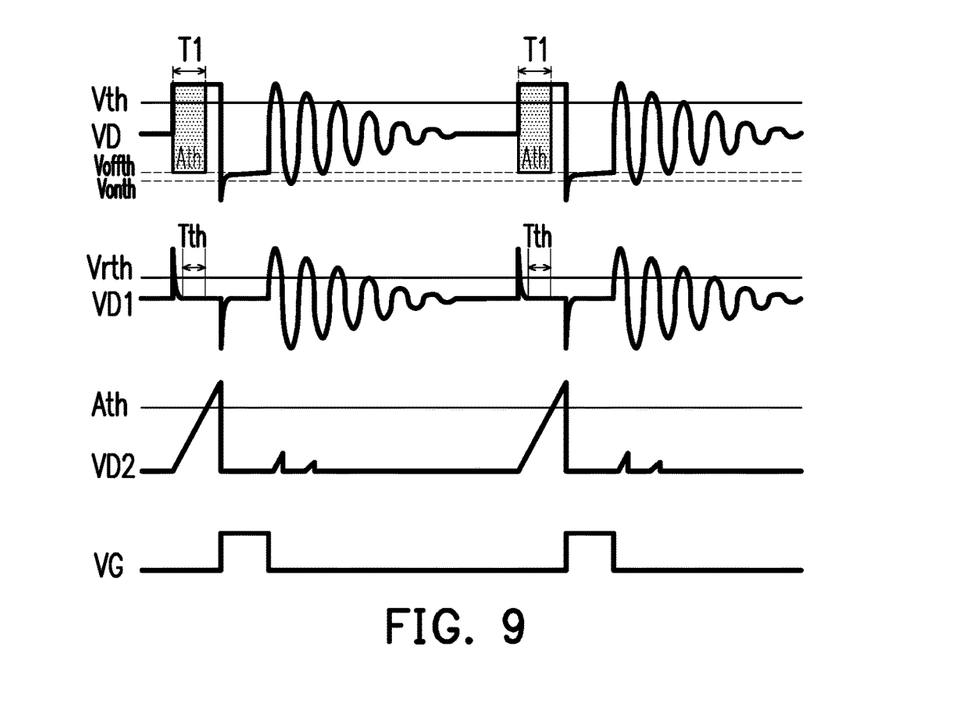
FIG. 9 is a schematic signal timing diagram of a synchronous rectification controller according to the still another embodiment of the disclosure.

FIG. 8 is a schematic circuit diagram illustrating a synchronous rectification controller according to still another embodiment of the disclosure, and FIG. 9 is a schematic signal timing diagram of the synchronous rectification controller of the embodiment of FIG. 8. With reference to FIG. 8 and FIG. 9, the difference between the embodiment of FIG. 8 and the embodiment of FIG. 3 lies in that the differentiation circuit of FIG. 3 is replaced by a differentiation-integration circuit 802 in this embodiment. The differentiation-integration circuit 802 may perform a differentiation operation and an integration operation on the drain voltage signal VD to obtain the differential signal VD1 and the integral signal VD2, and determine whether the signal value of the differential signal VD1 is greater than or equal to the predetermined derivative Vrth and whether the signal value of the integral signal VD2 is greater than or equal to the predetermined integral Ath during the period in which the drain voltage signal VD is greater than or equal to the predetermined voltage Vth.

When the signal value of the differential signal VD1 is greater than or equal to the predetermined derivative Vrth and the signal value of the integral signal VD2 is greater than or equal to the predetermined integral Ath during the period in which the drain voltage signal VD is greater than or equal to the predetermined voltage Vth, the differentiation-integration circuit 802 outputs a first control signal with a high voltage level to the AND gate 306. On the other hand, if the signal value of the differential signal VD1 is not greater than or equal to the predetermined derivative Vrth or the signal value of the integral signal VD2 is not greater than or equal to the predetermined integral Ath during the period in which the drain voltage signal VD is greater than or equal to the predetermined voltage Vth, the differentiation-integration circuit 802 outputs a first control signal with a low voltage level to the AND gate 306. The details of implementing the comparison circuit 304 and the turn-off control circuit 106 are the same as those in the embodiment of FIG. 3, so they will not be repeatedly described herein.

Accordingly, if the signal value of the differential signal VD1 is greater than or equal to the predetermined derivative Vrth and the signal value of the integral signal VD2 is greater than or equal to the predetermined integral Ath during the period in which the drain voltage signal VD is greater than or equal to the predetermined voltage Vth, the turn-on control circuit 104 may turn on the synchronous rectification transistor MSR at the next time when the drain voltage signal VD is less than or equal to the turn-on threshold voltage Vonth. On the other hand, if the signal value of the differential signal VD1 is not greater than or equal to the predetermined derivative Vrth or the signal value of the integral signal VD2 is not greater than or equal to the predetermined integral Ath during the period in which the drain voltage signal VD is greater than or equal to the predetermined voltage Vth, the turn-on control circuit 104 does not turn on the synchronous rectification transistor MSR at the next time when the drain voltage signal VD is less than or equal to the turn-on threshold voltage Vonth, to avoid turning on the synchronous rectification transistor MSR during the oscillation period of the drain voltage signal VD of the synchronous rectification transistor MSR.

In summary of the foregoing, the turn-on control circuit in the embodiments of the disclosure may perform at least one of a differentiation operation and an integration operation on the drain voltage signal of the synchronous rectification transistor, and determine whether to turn on the synchronous rectification transistor at the next time when the drain voltage signal is less than or equal to the turn-on threshold voltage according to at least one of the differential signal obtained by performing the differentiation operation and the integral signal obtained by performing the integration operation. Accordingly, by determining the change of the drain voltage signal of the synchronous rectification transistor with the differential signal and the integral signal, the inductor-current discharge period and the inductor-capacitor oscillation period can be accurately distinguished, effectively increasing the accuracy in controlling the switching of the synchronous rectification transistor to the turn-on state, to thus avoid turning on the synchronous rectification transistor during the inductor-capacitor oscillation period, which causes current reflux at an output terminal of the power conversion apparatus, thus causing damage to the power conversion apparatus.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A synchronous rectification controller, configured to control a turn-on state of a synchronous rectification transistor, the synchronous rectification controller comprising:
a turn-on control circuit, coupled to a drain terminal of the synchronous rectification transistor, performing at least one of a differentiation operation and an integration operation on a drain voltage signal of the synchronous rectification transistor, and determining whether to turn on the synchronous rectification transistor at a next time when the drain voltage signal is less than or equal to a turn-on threshold voltage according to at least one of a differential signal obtained by performing the differentiation operation and an integral signal obtained by performing the integration operation; and
a turn-off control circuit, coupled to the drain terminal of the synchronous rectification transistor, comparing the drain voltage signal with a turn-off threshold voltage, and turning off the synchronous rectification transistor when the drain voltage signal is greater than the turn-off threshold voltage,
wherein if the drain voltage signal is greater than or equal to a predetermined voltage, and a signal value of the differential signal is equal to 0 for a predetermined time during a period in which the drain voltage signal is greater than or equal to the predetermined voltage, the turn-on control circuit turns on the synchronous rectification transistor at the next time when the drain voltage signal is less than or equal to the turn-on threshold voltage; and if the drain voltage signal is not greater than or equal to the predetermined voltage, or the signal value of the differential signal is not equal to 0 for the predetermined time during the period in which the drain voltage signal is greater than or equal to the predetermined voltage, the turn-on control circuit does not turn on the synchronous rectification transistor at the next time when the drain voltage signal is less than or equal to the turn-on threshold voltage.

2. The synchronous rectification controller of claim 1, further comprising:
a logic circuit, coupled to the turn-on control circuit, the turn-off control circuit, and a gate terminal of the synchronous rectification transistor, and controlled by the turn-on control circuit and the turn-off control circuit to generate a synchronous rectification control signal to the gate terminal of the synchronous rectification transistor.

3. The synchronous rectification controller of claim 2, wherein the logic circuit comprises an SR flip-flop, a set terminal and a reset terminal of the SR flip-flop are respectively coupled to the turn-on control circuit and the turn-off control circuit, and an output terminal of the SR flip-flop is coupled to the gate of the synchronous rectification transistor terminal.

4. The synchronous rectification controller of claim 1, wherein the turn-off threshold voltage is greater than the turn-on threshold voltage.

5. A synchronous rectification controller, configured to control a turn-on state of a synchronous rectification transistor, the synchronous rectification controller comprising:
a turn-on control circuit, coupled to a drain terminal of the synchronous rectification transistor, performing at least one of a differentiation operation and an integration operation on a drain voltage signal of the synchronous rectification transistor, and determining whether to turn on the synchronous rectification transistor at a next time when the drain voltage signal is less than or equal to a turn-on threshold voltage according to at least one of a differential signal obtained by performing the differentiation operation and an integral signal obtained by performing the integration operation; and
a turn-off control circuit, coupled to the drain terminal of the synchronous rectification transistor, comparing the drain voltage signal with a turn-off threshold voltage, and turning off the synchronous rectification transistor when the drain voltage signal is greater than the turn-off threshold voltage, wherein if a signal value of the differential signal is greater than or equal to a predetermined derivative, and the signal value of the differential signal is maintained at 0 for a predetermined time after being reduced from greater than or equal to the predetermined derivative to 0, the turn-on control circuit turns on the synchronous rectification transistor at the next time when the drain voltage signal is less than or equal to the turn-on threshold voltage; and if the signal value of the differential signal is not greater than or equal to the predetermined derivative, or the signal value of the differential signal is not maintained at 0 for the predetermined time after being reduced from greater than or equal to the predetermined derivative to 0, the turn-on control circuit does not turn on the synchronous rectification transistor at the next time when the drain voltage signal is less than or equal to the turn-on threshold voltage.

6. A synchronous rectification controller, configured to control a turn-on state of a synchronous rectification transistor, the synchronous rectification controller comprising:
a turn-on control circuit, coupled to a drain terminal of the synchronous rectification transistor, performing at least one of a differentiation operation and an integration operation on a drain voltage signal of the synchronous rectification transistor, and determining whether to turn on the synchronous rectification transistor at a next time when the drain voltage signal is less than or equal to a turn-on threshold voltage according to at least one of a differential signal obtained by performing the differentiation operation and an integral signal obtained by performing the integration operation; and
a turn-off control circuit, coupled to the drain terminal of the synchronous rectification transistor, comparing the drain voltage signal with a turn-off threshold voltage, and turning off the synchronous rectification transistor when the drain voltage signal is greater than the turn-off threshold voltage, wherein if the drain voltage signal is greater than or equal to a predetermined voltage, and a signal value of the integral signal is greater than or equal to a predetermined integral during a period in which the drain voltage signal is greater than or equal to the predetermined voltage, the turn-on control circuit turns on the synchronous rectification transistor at the next time when the drain voltage signal is less than or equal to the turn-on threshold voltage; and if the drain voltage signal is not greater than or equal to the predetermined voltage, or the signal value of the integral signal is not greater than or equal to the predetermined integral during the period in which the drain voltage signal is greater than or equal to the predetermined voltage, the turn-on control circuit does not turn on the synchronous rectification transistor at the next time when the drain voltage signal is less than or equal to the turn-on threshold voltage.

7. The synchronous rectification controller of claim 6, wherein the predetermined integral is equal to an integral value of the drain voltage signal in a predetermined time during the period in which the drain voltage signal is greater than or equal to the predetermined voltage.

8. A synchronous rectification controller, configured to control a turn-on state of a synchronous rectification transistor, the synchronous rectification controller comprising:
a turn-on control circuit, coupled to a drain terminal of the synchronous rectification transistor, performing at least one of a differentiation operation and an integration operation on a drain voltage signal of the synchronous rectification transistor, and determining whether to turn on the synchronous rectification transistor at a next time when the drain voltage signal is less than or equal to a turn-on threshold voltage according to at least one of a differential signal obtained by performing the differentiation operation and an integral signal obtained by performing the integration operation; and
a turn-off control circuit, coupled to the drain terminal of the synchronous rectification transistor, comparing the drain voltage signal with a turn-off threshold voltage, and turning off the synchronous rectification transistor when the drain voltage signal is greater than the turn-off threshold voltage, wherein if a signal value of the differential signal is greater than or equal to a predetermined derivative and a signal value of the integral signal is greater than or equal to a predetermined integral during a period in which the drain voltage signal is greater than or equal to a predetermined voltage, the turn-on control circuit turns on the synchronous rectification transistor at the next time when the drain voltage signal is less than or equal to the turn-on threshold voltage; and if the signal value of the differential signal is not greater than or equal to the predetermined derivative or the signal value of the integral signal is not greater than or equal to the predetermined integral during the period in which the drain voltage signal is greater than or equal to the predetermined voltage, the turn-on control circuit does not turn on the synchronous rectification transistor at the next time when the drain voltage signal is less than or equal to the turn-on threshold voltage.

9. The synchronous rectification controller of claim 8, wherein the predetermined integral is equal to an integral value of the drain voltage signal in a predetermined time during the period in which the drain voltage signal is greater than or equal to the predetermined voltage.

10. A power conversion apparatus, comprising:
a transformer, having a primary side and a secondary side, wherein a first terminal of the primary side is configured to receive an input voltage, and a first terminal of the secondary side is configured to provide an output voltage to a load;
a synchronous rectification transistor, wherein a drain terminal of the synchronous rectification transistor is coupled to a second terminal of the secondary side, and a source terminal of the synchronous rectification transistor is coupled to a ground terminal; and
a synchronous rectification controller, coupled between the drain terminal and a gate terminal of the synchronous rectification transistor, configured to control a turn-on state of the synchronous rectification transistor, and comprising:
a turn-on control circuit, coupled to the drain terminal of the synchronous rectification transistor, performing at least one of a differentiation operation and an integration operation on a drain voltage signal of the synchronous rectification transistor, and determining whether to turn on the synchronous rectification transistor at a next time when the drain voltage signal is less than or equal to a turn-on threshold voltage according to at least one of a differential signal obtained by performing the differentiation operation and an integral signal obtained by performing the integration operation; and
a turn-off control circuit, coupled to the drain terminal of the synchronous rectification transistor, comparing the drain voltage signal with a turn-off threshold voltage, and turning off the synchronous rectification transistor when the drain voltage signal is greater than the turn-off threshold voltage,
wherein if the drain voltage signal is greater than or equal to a predetermined voltage, and a signal value of the differential signal is equal to 0 for a predetermined time during a period in which the drain voltage signal is greater than or equal to the predetermined voltage, the turn-on control circuit turns on the synchronous rectification transistor at the next time when the drain voltage signal is less than or equal to the turn-on threshold voltage; and if the drain voltage signal is not greater than or equal to the predetermined voltage, or the signal value of the differential signal is not equal to 0 for the predetermined time during the period in which the drain voltage signal is greater than or equal to the predetermined voltage, the turn-on control circuit does not turn on the synchronous rectification transistor at the next time when the drain voltage signal is less than or equal to the turn-on threshold voltage.

* * * * *